(No Model.) 4 Sheets—Sheet 2.
M. V. B. ETHRIDGE.
STREET SWEEPING OR CLEANING MACHINE.
No. 434,178. Patented Aug. 12, 1890.

Witnesses.
Inventor.

(No Model.) 4 Sheets—Sheet 3.
M. V. B. ETHRIDGE.
STREET SWEEPING OR CLEANING MACHINE.

No. 434,178. Patented Aug. 12, 1890.

WITNESSES. INVENTOR.

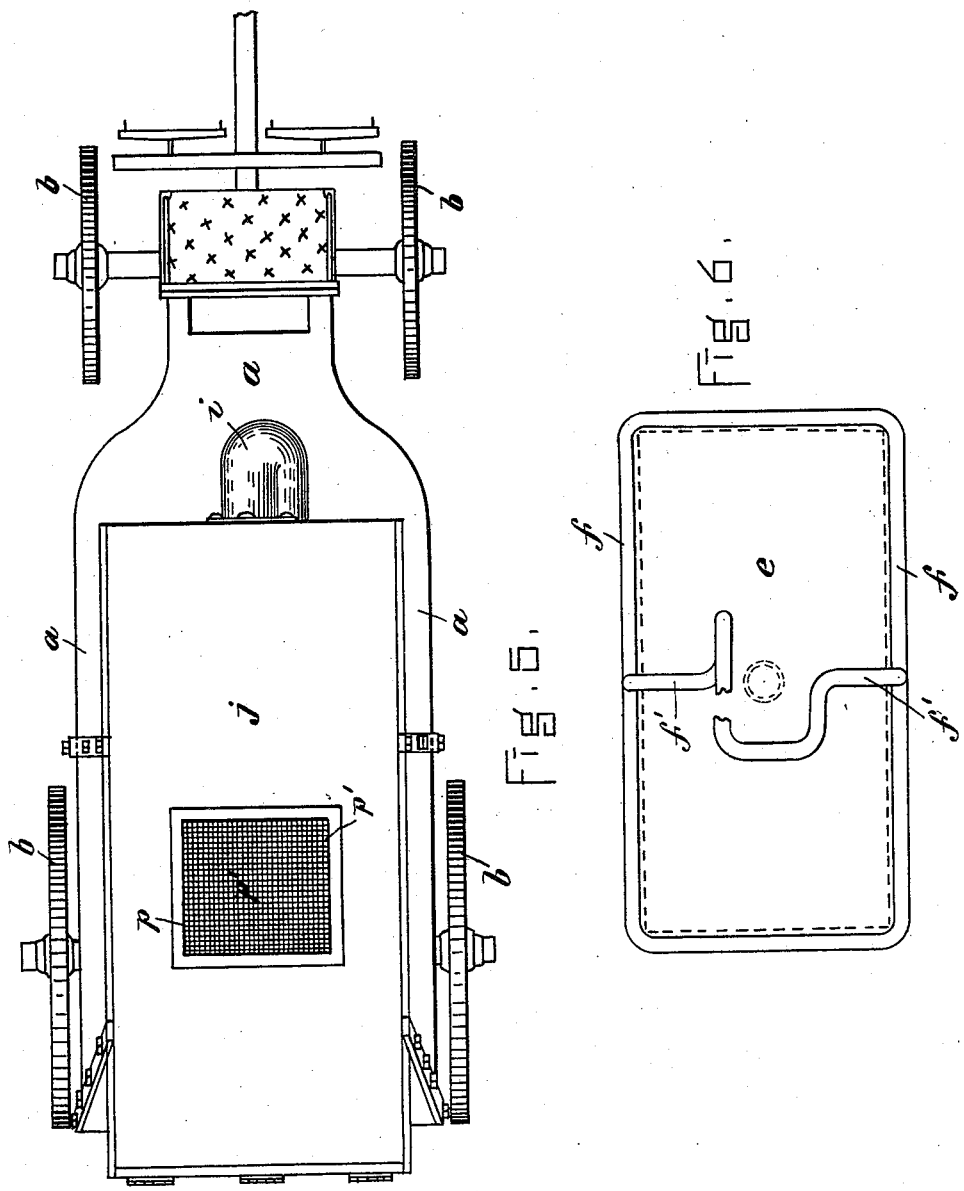

UNITED STATES PATENT OFFICE.

MARTIN V. B. ETHRIDGE, OF BOSTON, MASSACHUSETTS, ASSIGNOR OF ONE-HALF TO JOSIAH B. KENDALL, OF SAME PLACE.

STREET SWEEPING OR CLEANING MACHINE.

SPECIFICATION forming part of Letters Patent No. 434,178, dated August 12, 1890.

Application filed May 17, 1890. Serial No. 352,199. (No model.)

*To all whom it may concern:*

Be it known that I, MARTIN V. B. ETHRIDGE, of Boston, in the county of Suffolk and State of Massachusetts, have invented certain new and useful Improvements in Street Sweeping and Cleaning Machines, of which the following is a specification.

This invention has for its object to provide an apparatus for removing dirt and light débris from streets wholly by pneumatic action; and it consists, first, in the combination, in a street-cleaning machine, of an air-forcing apparatus, an air pipe or conduit communicating therewith and arranged to deliver jets or blasts of air upon the surface to be cleaned in such a manner as to loosen and set in motion the fragments and particles to be removed, and an air-exhausting apparatus communicating with a hood or casing over the area on which the débris is loosened and agitated by the air-blast, said exhausting apparatus being adapted to convey the débris through a suitable passage, and a receptacle communicating with said passage for the reception of the débris.

The invention also includes the combination, with the apparatus organized as above indicated, of a suitable carriage supporting the apparatus and a motor on said carriage, whereby the air forcing and exhausting apparatus may be operated, all of which I will now proceed to describe.

Figure 1:
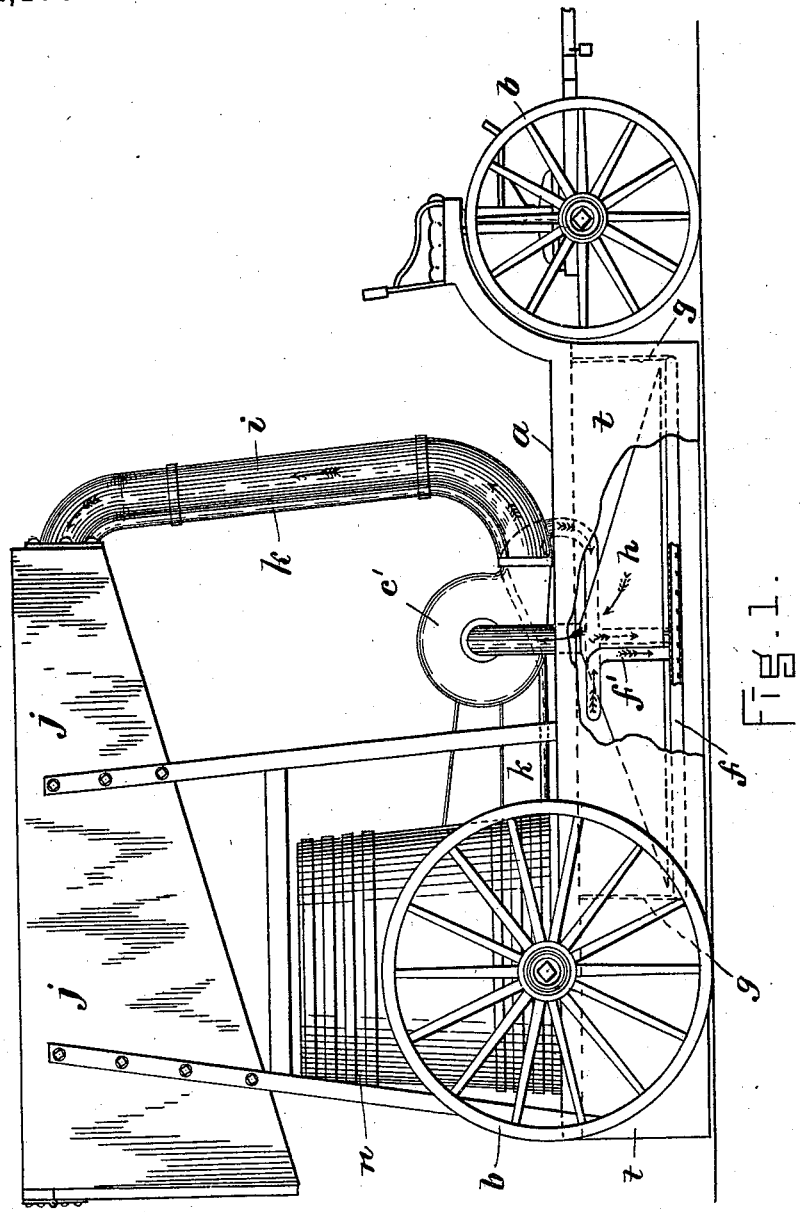
Figure 2:
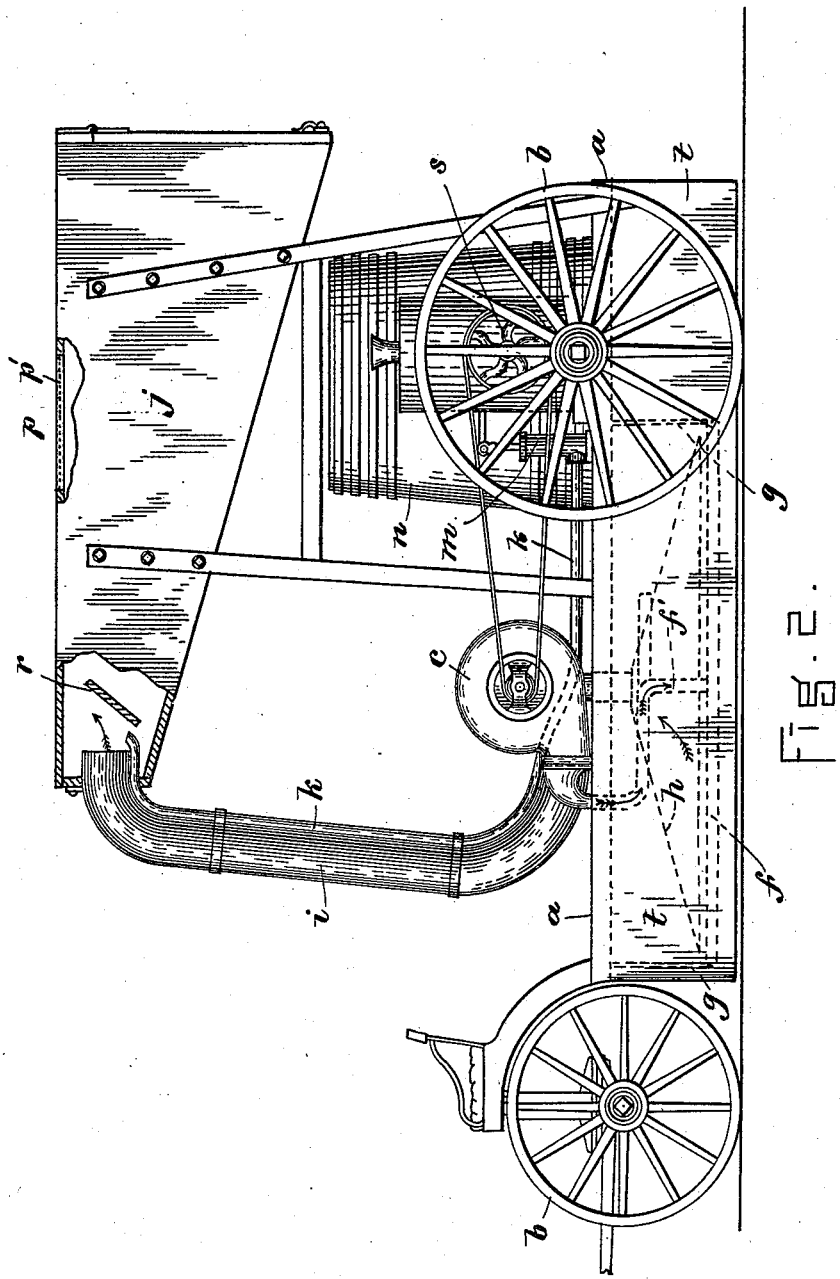
Figure 4:
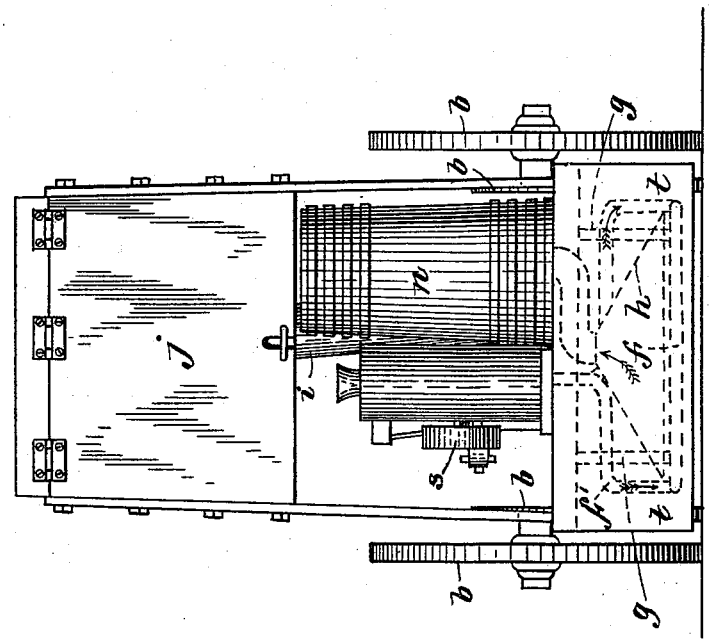
Figure 3:
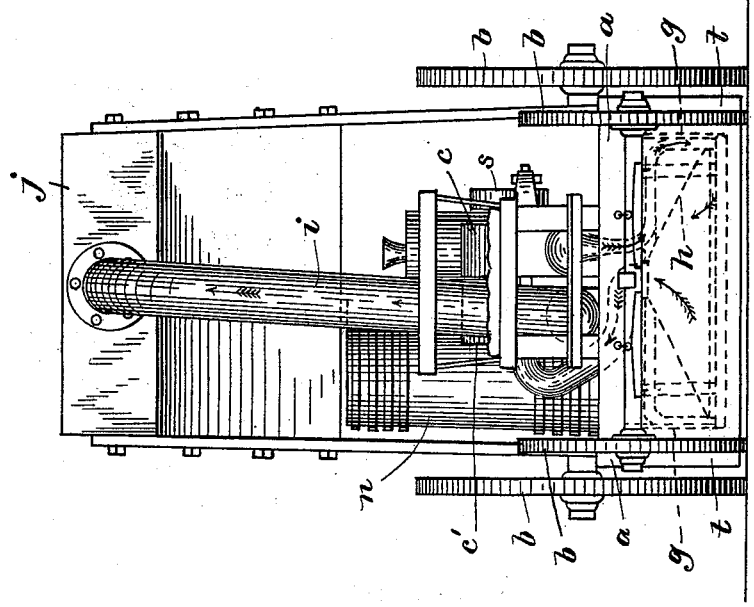

In the accompanying drawings, forming a part of this specification, Figure 1 represents a side elevation of a machine embodying my invention. Fig. 2 represents an elevation of the opposite side, showing certain parts in section. Fig. 3 represents a front, and Fig. 4 a rear, elevation of the machine. Fig. 5 represents a top plan view of the machine. Fig. 6 represents a top view of the pipe or conduit which communicates with the air-forcing apparatus.

The same letters of reference indicate the same parts in all the figures.

In carrying out my invention I provide a suitable carriage comprising a supporting-frame $a$, of any suitable form, and wheels $b$ $b$, the whole being adapted to be drawn or impelled along the street in any suitable way, usually by horses, the machine being provided with the usual appliances for the connection of one or more horses to it. Mounted upon the frame $a$ is an air-forcing apparatus, which is preferably a blower $c$, of any suitable type adapted to deliver a strong current through a pipe or conduit connected with its casing. Said air-forcing apparatus communicates with one or more pipes constituting a conduit which conducts the air to the area upon which the blasts are to be directed for the purpose of loosening and agitating the débris. Said conduit may be arranged in any suitable way. I prefer to make the conduit in the form of a horizontal pipe $f$, supported by brackets or hangers $g$ from the frame $a$, and arranged in close proximity to the surface to be cleaned, said pipe being preferably bent to surround or nearly surround a space $e$ directly over the surface of the street, and provided with numerous orifices or nozzles, which are arranged to direct numerous jets or blasts of air inwardly and downwardly into said space, so that all the dust and débris on the surface over which the apparatus is passing will be agitated and set in motion by the air-blasts. The horizontal portion $f$ of the conduit is connected with the blower or air-forcing apparatus $c$ by means of a pipe or pipes $f'$, extending from the casing of the blower to the horizontal pipe $f$.

$h$ represents a hood, which is located immediately over the space inclosed by the horizontal pipe $f$, and is preferably of sufficient area to nearly or quite cover said space. Said hood communicates with the casing of an air-exhausting apparatus or blower $c'$, which is mounted upon the supporting-frame $a$ beside the blower $c$, or in any other suitable relation thereto.

$i$ represents a trunk or flue which connects the casing of the air-exhausting apparatus with a receptacle $j$, which is suitably supported upon the carriage, preferably at a point higher than the blowers above described. The exhaust-blower is arranged to draw air upwardly from the hood $h$ and force it through the trunk or flue $i$ into the receptacle $j$, the force of the air-current thus created being sufficient to carry the matter set in motion by the air-forcing apparatus into the receptacle $j$.

$k$ represents a water-supplying pipe connected with a pump $m$, which is supported by the carriage, and communicates with a water tank or receptacle $n$ on said carriage. The pipe $k$ is arranged to deliver a stream or streams of water into the receptacle $j$ for the purpose of moistening the débris in said receptacle and arresting the lighter particles or dust, so that the same will not escape from the receptacle to any detrimental extent through the opening $p$, which is necessarily provided in the upper portion of said receptacle for the escape of air therefrom.

If desired, suitable means—such as baffle-plate or deflector hereinafter described—may be provided in the receptacle $j$, to diffuse or atomize the water introduced by the pipe $k$, so that the dust and débris will be thoroughly controlled by the water.

$r$ represents a baffle-plate or deflector, which is placed in the receptacle $j$ near the point where the flue $i$ enters said receptacle, said baffle-plate being intended to divert the current of dust and dirt laden air as it enters the receptacle, and prevent the same from taking a direct course through the receptacle, thus facilitating the precipitation of the solid matter to the bottom of the receptacle. Said baffle-plate is arranged so that the stream of water discharged by the pipe $k$ will impinge upon said plate and be broken up or atomized thereby.

To operate the air forcing and exhausting apparatuses above mentioned, as well as the pump $m$, I provide a motor, which is preferably an engine adapted to use liquid fuel—such as kerosene-oil—said engine being of any suitable construction, such, for example, as that embodied in the well-known Shipman engine. Connections are made from the driving-shaft $s$ of said engine to the shaft or shafts of the air forcing and exhausting devices and to the pump.

$t$ represents a skirt or apron of stout canvas or other suitably strong and flexible material attached to the frame $a$ and surrounding the air-delivering pipe $f$ and hood $h$, said skirt being arranged so that its lower edge bears upon or is in close proximity to the surface of the street. The object of said skirt is to prevent any dust that may fail to pass into the hood $h$ from escaping from the vicinity of the machine. I do not limit myself to the use of this skirt, however, because, as a general thing, the air-exhausting apparatus will remove all the dust that is raised by the action of the air-forcing apparatus. The opening $p$ in the receptacle $j$ is provided with a screen $p'$ to prevent the escape of the coarser portions of the débris.

I claim—

1. In a pneumatic sweeping-machine, the combination of an air-forcing apparatus, an air-supply pipe or conduit arranged to direct jets or blasts of air upon the surface to be swept, and an air-exhausting apparatus arranged to remove the débris which is set in motion by the air-forcing apparatus, as set forth.

2. In a pneumatic sweeping-machine, the combination of a suitable carriage, an air-forcing apparatus, a pipe or conduit arranged to deliver blasts or jets of air from said air-forcing apparatus upon the surface to be cleaned, an air-exhausting apparatus having a hood arranged over the air-delivering pipe, a receptacle for the débris, and a passage connecting the air-exhausting apparatus with the said receptacle, as set forth.

3. In a pneumatic sweeping-machine, the combination of a carriage, a motor thereon, an air-forcing and an air-exhausting apparatus on said carriage, and operative connections between the said motor and the air forcing and exhausting apparatuses, as set forth.

4. In a pneumatic sweeping-machine, the combination of a carriage, an air-forcing apparatus, a pipe or conduit arranged to deliver blasts of air from said air-forcing apparatus upon the surface to be cleaned, a hood over said pipe, an air-exhausting apparatus communicating with said hood, a receptacle connected by a flue with the air-exhausting apparatus, a water-tank on the carriage, a pump communicating with said tank, a pipe extending from the pump into the receptacle, and means for operating said pump, as set forth.

In testimony whereof I have signed my name to this specification, in the presence of two subscribing witnesses, this 15th day of May, A. D. 1890.

MARTIN V. B. ETHRIDGE.

Witnesses:
A. D. HARRISON,
ARTHUR W. CROSSLEY.